Jan. 13, 1931.  C. O. MERCKEL  1,788,536
ROD HOLDER
Filed July 30, 1927
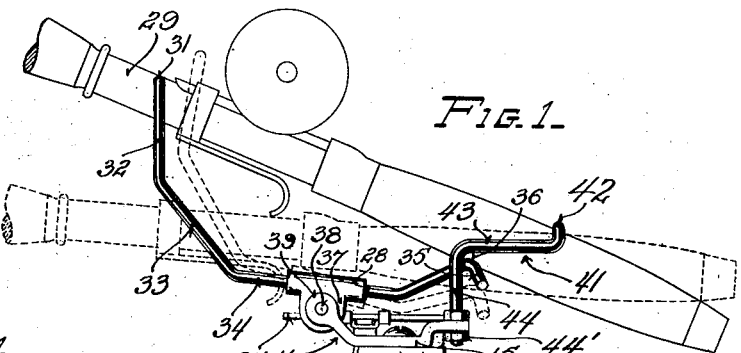
INVENTOR.
CHARLES O. MERCKEL.
BY
ATTORNEY.

Patented Jan. 13, 1931

1,788,536

UNITED STATES PATENT OFFICE

CHARLES O. MERCKEL, OF MILWAUKEE, WISCONSIN

ROD HOLDER

Application filed July 29, 1927. Serial No. 209,404.

This invention relates to rod holders.

In my prior Patent No. 1,529,265, issued March 10, 1925, I have described a holder for fishing rods which provides a sure and firm anchorage for a rod under all conditions of use and yet permits an easy application and removal of a rod thereto and therefrom without conscious effort on the part of the manipulator. The rod holder of the present invention is similar in these respects to the holder described in said patent.

One object of the present invention is the provision of a rod holder for the purposes mentioned so constructed and arranged as to permit a more convenient adjustment thereof to thereby render the same more readily adaptable to varied conditions of use.

Another object is the provision of a rod holder for the purposes mentioned which when not in service may be readily collapsed or folded into a compact unit so as to occupy a minimum space within a fishing kit.

Another object is the provision of a rod holder for the purposes mentioned so designed as to better withstand the severest strains to which it might be subjected under various conditions of use.

Another object is the provision in a rod holder of a clamping element especially designed to insure against loss of the rod in the event of accidental displacement thereof from its normal position in the holder.

Other objects and advantages will appear from the following description of an illustrative embodiment of the present invention.

In the drawings:—

Figure 1 is a view in side elevation of a rod holder constructed in accordance with the present invention, and showing a rod in two positions therein.

Fig. 2 is a fragmentary sectional view on a larger scale.

Fig. 3 is a view in end elevation looking from right to left in Figure 1.
Fig. 4 is a view in side elevation showing the holder collapsed into a compact unit.

The rod holder shown comprises a two-part bracket including a base casting 10 and a head casting 11 rotatably seated on the base casting. The base casting is formed with a disc portion 12, forming a seat for the head casting, and supported by an upright shank portion 13 having an arcuate tongue 14, hereinafter described, depending from the lower end thereof. The head casting includes a disc portion 15, centrally perforated to receive an appropriate pivot 16, which in this instance is in the form of a screw, projected loosely through the disc portion 15 and threaded or otherwise anchored in the disc portion 12 of the base casting. The screw 16 is securely held by a lock nut 17.

A pin 18, guided within a boss 19 formed upon the disc portion 15 of the head casting, normally projects into one of a circular series of holes 20 formed in the disc portion 12 of the base casting, to thereby releasably secure the head casting in any desired rotative position on the base casting. The pin 18 is actuated and controlled by an appropriate tang 21, preferably of spring steel, anchored at one end 22 upon an elevated flange 23, formed upon the disc portion 15, and projected forwardly over the disc portion so that the free end 24 thereof may be conveniently manipulated by the user. An appropriate hanger 25, fixed to the tang 21 and engaged beneath the head 26 of the pin 18 provides an appropriate operating connection therebetween.

A rack 27, rockably mounted upon the head casting 11, provides an open support for the reception of a fishing rod 29. The rack shown is formed of a single piece of heavy gauge wire bent intermediate its ends to form a forward elevated seat 30 for the reception of the rod, then sharply and reversely bent, as at 31, to provide substantially upright supports 32 for the seat 30, then bent to form convergent portion 33 which merge into substantially parallel portions 34 and ultimately terminate in divergent portions 35 providing a rear seat 36 for the rod. The rack 27 is supported intermediate its ends upon an appropriate saddle 28, preferably of sheet metal. The saddle is fixed to and embraces the parallel portions 34 and is formed with depending spaced ears 37 suitably perforated to receive a horizontal pivot pin 38 removably fixed within a pair of spaced ears 39, projecting forwardly from the disc portion 15 of the head casting. In this instance the pivot pin 38 is in the form of a thumb screw projected through one of the ears 39 and threaded into the other ear, and provided with a manipulating head 40. The disc 15 of the head casting 11 also carries a rod clamping element 41 which normally coacts with the seat 36 to firmly grip the rod therebetween. In this instance the element 41 is formed of heavy gauge wire bent to form a curved portion 42, supported by and between a pair of spaced horizontal portions 43, which in turn are supported by a pair of substantially upright portions 44 anchored in the flange 23 by appropriate means such as nuts 45.

The arrangement is such that the weight of a rod within the rack 27 tends to rock the same counter-clockwise, so that the rear seat 36 is forced upwardly and coacts with the curved portion 42 to securely grip the rod therebetween. Furthermore this gripping pressure increases in response to a downward pull upon the free end of the rod. The horizontal portions 43 of the element 41 are so spaced as to permit free entry of the heel of the rod therebetween. This and the fact that the forward seat 30 is open to receive the rod makes it possible to apply the rod to the holder without conscious effort on the part of the user.

It will be noted, on reference to Figure 3, that the upright portions 44 of the element 41 are curved upwardly and outwardly to thereby form in effect a wedge seat below and forwardly of the portion 42. Should the rod, from any cause, become displaced from the forward seat 30 and fall into the dotted line position shown in Figure 1, it is securely held against loss by reason of a three point wedging contact thereof with and between the two curved upright portions 44, as indicated in dotted lines in Figure 3, and with and beneath the portion 42, as indicated in Figure 1.

The tongue 14, hereinabove mentioned, is designed for adjustable connection with an appropriate support. In the rod holder shown the support comprises a well known type of C-clamp 45 which in this instance is formed with an external boss 46 adapted to receive the tongue 14. A screw 47, projecting through a longitudinal slot 48 in the tongue and threaded into the boss provides an appropriate clamping means therefor. Coacting transverse ribs 49 and grooves 50 formed upon the boss and tongue insure a rigid connection therebetween when the screw 47 is tightened. A lengthwise adjustment of the tongue 14 upon the boss 46 may thus be had, which, due to the arcuate form of the tongue, provides an easy setting of the holder and rod at any inclination desired. This connection also permits the supporting clamp 45 to be rotated about the axis of the screw 45 from the upright position shown in full lines in Figure 1 into the dotted line position, so that the clamp may be applied to either a horizontal or upright support.

It will be further noted from an inspection of Figure 4 that the parts of the holder are so constructed and arranged as to permit the same to be collapsed into a compact unit as indicated in Figure 4. To effect this collapsed condition the tongue 14 is adjusted upon the boss 46 in such position that the base casting 11 lies adjacent the side of the clamp 45, and the head casting 10 is rotatably adjusted upon the base casting so that the element 41 is adjacent the clamp and the ears 39 project outwardly. The thumb screw 38 is then withdrawn to thereby release the rack 27 and permit the same to be inverted and disposed between the ears 39 with the portions 32 contacting with the tongue 14 and with seat 36 projected toward the clamp. The thumb screw 38 is then reinserted in the ears 39 over the rack 27 so as to retain the same in the position shown. With the parts thus secured in this compact arrangement the holder requires very little space when out of use.

Various changes may be made in the embodiment of the invention hereinabove specifically described without departing from or sacrificing any of the advantages of the invention as defined in the appended claims.

I claim:—

1. In a rod holder the combination of a base member, a head member rotatable thereon, a plurality of holes in one of said members, a resilient member fixedly mounted at one end on the other of said members, a locking pin fixedly mounted on said resilient member and reciprocable in the other of said members to coact with said holes to releasably lock said head member in any of a plurality of positions on said base member, a rod holder carried by said head member, and an adjustable mounting for said base member.

2. In a rod holder the combination with a two part bracket comprising a base member having an upright shank portion, an arcuate tongue depending from the lower end of said shank portion, and a substantially horizontal seat portion at the upper end of said shank portion, and a head member rotatably mounted on said seat, of a rod holder carried by said head member, a supporting clamp, and adjustable connection between said tongue and clamp whereby said seat may be shifted from operative position above the clamp into inoperative position closely adjacent the side of the clamp to form a compact unit when not in use.

3. In a rod holder the combination of a bracket, a support therefor, a rack rockably mounted upon said bracket, forward and rear seats on said rack for receiving a fishing rod, and a clamping element on said bracket cooperating with said rear seat to grip the rod therebetween, said element comprising a pair of outwardly projecting uprights, and a member supported by said uprights and positioned to overlie the rod, said member and said pair of outwardly projecting uprights forming a three-point contact with the rod to prevent accidental withdrawal of the rod from the holder when the rod has been dislodged from said forward seat.

In witness whereof, I hereunto subscribe my name this 23d day of July, 1927.

CHARLES O. MERCKEL.